July 18, 1944.     A. H. SHARPE ET AL     2,354,091

OPTICAL DEVICE AND MANUFACTURE THEREOF

Filed Sept. 25, 1941

INVENTORS
ALFRED H. SHARPE
AND VICTOR WALKER
BY
Bean, Brooks Buckley & Bean.
ATTORNEYS Patented July 18, 1944

2,354,091

UNITED STATES PATENT OFFICE 2,354,091

OPTICAL DEVICE AND MANUFACTURE THEREOF

Alfred H. Sharpe, Buffalo, N. Y., and Victor Walker, Fort Erie, Ontario, Canada, assignors to AlnCin, Inc., Buffalo, N. Y.

Application September 25, 1941, Serial No. 412,318

18 Claims. (Cl. 41—42)

This invention relates to glass articles and to methods and means for shaping and finishing the same, and more particularly to a novelly finished form of efficient light transmitting glass bodies, and to the method of providing the same. The primary object of the invention is to provide improved methods and means for shaping and finishing glass surfaces so as to be suitable for optical purposes and the like, and whereby important economies may be effected in connection with the manufacture thereof, and whereby new and improved forms of optical devices are obtainable. Another object of the invention is to provide a new form of optical glass surface which is of reduced light reflection characteristics and is less subject to deterioration in the manner termed in the art as "weathering" than are similar glass surfaces prepared by conventional glass finishing methods. Other objects and advantages of the invention will be apparent from the following specification.

Figure 1:
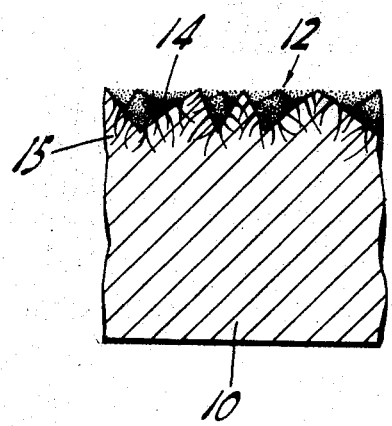
Fig. 1 is a micrograph section of a fragment of glass stock subsequent to performance of a first or shaping step of the method of the invention thereon which involves grinding of a surface portion of the stock piece to a prescribed dimension and contour.

The invention is illustrated in the drawing in connection with processing of a piece of glass stock designated 10; and it will be understood that the processing method illustrated and described hereinafter may be taken as being illustrative of the manufacture of any form of glass body for optical or other light transmission purposes, and that the fragment of glass stock specifically illustrated and referred to herein may constitute an increment of any stock piece as may be required to provide the desired finished article.

As the first step of the method of the invention the stock piece 10 is initially ground by means of any suitable glass grinding process, such as by employing abrasive granules of the diamond dust type or the like, under a suitable lap shaped complementary to the desired general contour of the finished ground surface. Thus, any irregularities in the surface of the original stock piece such as may result from the method of originally molding or otherwise providing the same will be eliminated, and the stock piece will thus be accurately shaped to the prescribed general contour thereof but will be locally irregular and of cusped surface form as illustrated at 12 (Fig. 1). Also, it will be noted that, as is typical of a ground glass surface, the crevices between the cusped portions of the stock piece will be substantially filled with white and "frosty" appearing accretions, as is indicated at 14, comprising finely divided glass particles which have been fused and welded or otherwise attached to the fractured structure. It will also be noted that, as illustrated at 15, the sub-surface portions of the cusped ground surface 12 are interiorly fractured, as is typical of ground glass, as an incident to the grinding operation thereon.

Figure 2:
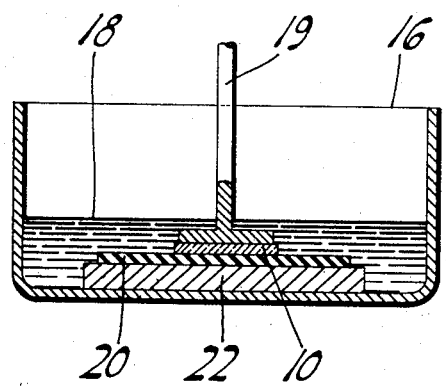
Fig. 2 is a diagrammatic illustration of the finishing or second step of the method of the invention wherein the ground glass stock piece of Fig. 1 is being treated chemically for finishing the previously ground surface portion thereof.
Figure 4:
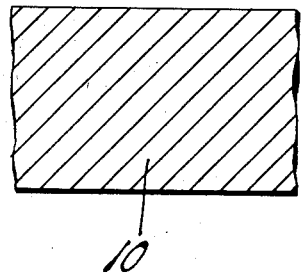
Fig. 4 is a view corresponding to Figs. 1 and 3 of the finished article of the invention.

To reduce this ground and fractured glass structure to perfectly regular and finished form it is next subjected to a novel physio-chemical process as illustrated by Fig. 2. For this purpose a tank or vessel 16 is partially filled as indicated at 18 with a suitable acid solution, and the glass stock piece 10 is fastened to a spindle 19 and lowered into the acid bath so that the ground surface portion 12 of the stock piece is brought to bear lightly against a master plate 20. Preferably the master plate will be provided of some elastic and acid resistant material such as rubber or a suitable synthetic resin substance, or the like; and it may be backed up by a base plate 22 of any suitable stiff and acid resistant material. The spindle 19 is then actuated either manually or mechanically in such manner that the stock piece 10 is oscillated relative to the rubber master or pad 20 while the ground surface portion 12 of the stock piece is maintained in sliding contact with the surface of the pad 20 but without substantial pressure therebetween. This action is continued until such time as the ground and fractured surface portion 12 of the stock piece is completely removed, at which time it will be found that the finished surface is perfectly regular and comprises only freshly exposed native glass which is perfectly clear and of optical finish grade, as illustrated by Fig. 4.

The character and relative proportioning of the ingredients of the chemical finishing solution referred to hereinabove will, of course, be preferably varied according to the character of the glass stock. However, by way of specific example, we have found that when working with glass stock of relatively high metal contents the chemical finishing solution will preferably comprise a mixture of hydrofluoric and sulphuric acids in water. However, when working, for example, with glass stock having a relatively high barium content we prefer to employ an aqueous solution of hydrofluoric and sulphuric and phosphoric acids, or perhaps an aqueous solution of hydrofluoric and phosphoric acids alone.

We have found, as a result of many experiments, that acid finishing solutions of the above stated character will provide good results, and it appears that the action of the finishing solution upon the glass stock comprises an initial reaction between the hydrofluoric acid ingredient and the glass structure whereby silica-fluoride salts are formed and reacted with immediately by the modifying sulphuric acid or phosphoric acid ingredient. Thus, the silica-fluoride salts which would otherwise immediately attach to the glass structure to provide the effect which is commonly known as "etched" glass are instead immediately converted into fluoric acid and salts of sulphuric or phosphoric acids, as the case may be. Since the silica salts of sulphuric or phosphoric acids so produced do not have the peculiar tendency to adhere to the native glass structure, these salts precipitate as loose solids in the bath and are freely motivated by the master pad 20 as explained hereinabove for the purpose of the invention. Consequently the invention clearly distinguishes from acid treating processes of the prior art of the glass etching type, and the finished articles of the invention are of perfectly clear and highly transparent form at every surface portion thereof.

Figure 3:
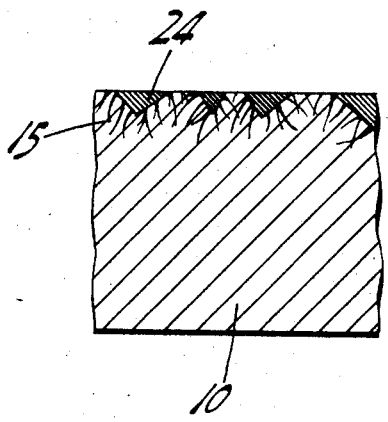
Fig. 3 is a view corresponding to Fig. 1 of the stock piece at an intermediate stage of the chemical finishing process.

Fig. 3 illustrates the condition of the stock piece ground face during an intermediate stage of the acid finishing process at which time the cusps of the ground surface structure will have been partially reduced. It will be noted that the relative movement between the spindle-carried stock piece and the master pad 20 provides an action which continuously supplies fresh acid solution to the high points of the stock piece structure, whereby the active ingredients thereof are enabled to react with the glass of the cusped structure to form fluoride salts. These salt by-products of the reaction are substantially insoluble in the bath and precipitate as solids which are mechanically motivated into the valley portions of the cusped structure and are deposited therein to mask the relatively recessed wall portions thereof as indicated at 24 (Fig. 3) against the action of the acid bath. However, it will be appreciated that the topmost portions of the cusped structure are continuously swept clean of the fluoride salt by-products by the movement relative to the master pad 20, and are thereby continuously exposed to the action of fresh acid. Thus, the reduction process of the invention involves a combination physical and chemical process which is so arranged as to automatically provide a relatively rapid acid action against the high portions of the glass stock structure and a retard or resist against such action at the recessed portions of the glass stock. Thus the chemical reduction action is thereby controlled so as to be effective only at the points which actually require to be reduced and so as to ultimately provide a perfect levelling of the stock piece to a newly exposed and perfectly regular native glass surface (Fig. 4).

It will be appreciated that this reduction of the previously shaped stock to finally finished surface form is accomplished without abrasion action or the like, and that therefore the finished surface is of freshly exposed native glass which is unscratched and free from fracturing or welding effects or the like such as are invariably present in the finished surface and sub-surface portions of abrasively processed optical lenses or the like. This is because no abrasive-type materials are employed and no heavy pressure forces are involved.

It will also be appreciated that the method of the invention involves initially an accurate reduction of the glass stock piece to the prescribed order of shape and dimensioning by means of any suitable simple and inexpensive operation. Thus, for example, the initial shaping process of the method may be conveniently performed through use of any suitable type of metal lap, or the like, and it will be appreciated that this first grinding shaping step of the method of the invention need only comprise a single grinding operation as distinguished from a long series of separate grinding operations employing successively finer abrasives, such as is required in connection with conventional lens grinding methods. The second phase of the method of the invention comprises a direct reduction of the previously accurately contoured structure from locally cusped surface form to perfectly regular form; and it will be understood that this later reduction or finishing step of the method may also be performed as a single operation requiring only a small amount of time as compared to conventional optical finishing processes of the rouging or buffing type wherein a multitude of finishing operations employing successively finer grades of rouge or the like are required.

For example, the initial shaping operation of the method of the invention may require only from ten to fifteen minutes of time, depending upon the size of the disc and the dimensional irregularity of the original stock piece and the amount of excess glass to be removed therefrom. The second or chemical finishing step of the invention may then be completed in something like one-half hour. It is therefore obvious that from the standpoint of time and labor costs involved the method of the invention effects great economies. Also, it will be understood that the method of the invention effects substantial economies from the standpoint of materials consumed, in that only one grinding operation need be employed and in that the ingredients of the acid bath of the invention are relatively inexpensive.

The greatest features and advantages of the invention as compared to the prior art are, however, concerned with the qualities of the finished articles. Particular attention is called to the fact that throughout the entire finishing step of the method of the invention the stock piece 10 is at all times separated from the master pad 20 by a thin film of liquid which lubricates the relative movement therebetween and positively separates the surfaces thereof so as to avoid possible rubbing or scratching action by the master pad against the glass stock. Thus, the finishing method of the invention distinguishes fundamentally from any abrasion-type finishing method such as rouge buffing processes as are conventionally employed in the optical trades.

Conventional abrasive-employing methods of glass shaping such as are presently used in connection with the optical arts accomplish removal of the excess glass stock through simple scratching and gouging processes conducted under substantial pressures and with successively finer grades of abrasive granules until finally the finest available grade of rouge is employed to produce a buffed-type finished surface. Thus, the finished surface is superficially of highly polished and glossy form and appears to be of regular contour; but it is known that such finished surfaces actually comprise "rubbed" and secondarily fused or welded glass structure whereby the outer layers of the surfaces are of reduced light transmitting capacities and are particularly susceptible to attack by elements of the atmosphere in such manner as to induce deterioration of the character referred to in the trade as "weathering." The explanation for this appears to be that whenever a conventional abrasion process is directed against a glass surface, and as the grains of abrasive dig multitudes of grooves and scratches into the glass surface, as an incident to each gouging or scratching action of the abrasive granules the adjacent glass structure is subjected to cracking or fracturing stresses. Microscopical examination of abrasively treated glass bodies will invariably reveal the presence of such sub-surface fractures, as indicated at 15 in the drawing; and it has been found that such fracturing tendencies are present even in conjunction with use of the finest grades of abrasive materials. Consequently no matter how fine the grading of the abrasive or rouge material in connection with conventional lens finishing methods, the inherent tendency of such method is to continue to provide sub-surface fracturing as the surface reduction continues, and it is only because of the rubbing and re-welding action of the finishing laps that the final glass surface appears to be superficially smoothed-over and regular. Thus, it will be appreciated that the surface formations of conventionally ground and finished lenses or the like are inherently imperfect, as distinguished from the qualifications of the native glass material from which the stock piece is originally formed. It will also be appreciated that surfaces finished by such abrasion methods are of "rubbed" nature, and are therefore highly glossy and inherently guilty of high reflection loss characteristics.

As distinguished from the above, the finished surface of the present invention is provided by first shaping the stock piece to the prescribed general surface contour thereof through use of a simple yet accurate shaping operation which leaves the stock piece in only locally irregular surface form; while the second step of the method eliminates the locally irregular and stressed glass structure so as to present a thoroughly native glass structure of identical contour, and which contains no sub-surface imperfections or surface or sub-surface characteristics artificial to the qualities of the native glass of the stock piece. Thus, the finished surface of the invention is of relatively non-reflective characteristics, having been subjected to nothing resembling a buffing or rubbing process. Also, the surface of the invention comprises purely primary glass structure which is free of fracturing or other stress results, and is therefore of unreduced light transmitting ability and invulnerable to attack by agencies such as normally produce rapid deterioration effects known as "weathering" in connection with glass surfaces finished by abrasion type finishing methods of the prior art.

Another important distinction between the method of invention and methods of the prior art is that whereas, in connection with lap grinding and finishing operations of the prior art the laps are depended upon to provide accurate shaping of the article as it is being finished, the laps invariably wear under the action of the abrasive materials and are thus constantly becoming inaccurate as to dimension and form. Thus, a perfect shaping of the finished article by such a method is impossible. As distinguished from this, in the method of the present invention the stock piece is initially shaped to the prescribed general contour thereof, and the locally irregular surface structure resulting therefrom is then removed by means of a chemical agent without introduction of contour errors such as inevitably accompany use of abrasive applying laps in conjunction with the methods of the prior art. This is because the acid controlling master (20 in the drawing) of the invention is provided of elastic material, and it is thereby adapted to conform exactly to the prescribed general contour of the surface, and thus does not attempt to cause the contour of the stock piece to deviate therefrom as the chemical reduction process continues. However, as the chemical treatment proceeds the master 20 controls the removal of the acid-masking salt by-products from the local depressions of the surface being processed and so controls replenishment of fresh acid supplies to the highest portions of the surface being processed so that an accurate leveling of the previously irregular surface structure is provided in the novel manner of the invention. Thus, the form of the finished surface of the article of the invention is more accurately controllable as compared to processes of the prior art, and an improved product is obtainable.

It will be understood that although Fig. 2 of the drawing herein illustrates the method of the invention as being practiced in conjunction with the production of optical discs or flats, that any other shape of surface may be produced by suitably shaping the master pad so as to complement the desired contour of the finished article and by suitably actuating the spindle or other stock piece carrying means so as to provide proper relative motion between the stock piece and the master pad to eliminate the ground and fractured surface structure and to reduce the stock piece finally to the desired dimension and shape.

It is contemplated that in lieu of the specific grinding method illustrated and described hereinabove as illustrative of the original general shaping process of the invention, any other suitable accurate shaping process may be employed to reduce the stock piece to prescribed shape. For example, in some instances it may be feasible to mold the stock piece to sufficiently accurate surface form so that the master-controlled acid finishing process of the invention may be applied directly thereto with suitable results. It will also be understood that although only one form of the invention has been illustrated and described in detail hereinabove, that various changes may be made therein without departing from the spirit of the invention and the scope of the appended claims.

We claim:

1. A method of shaping and finishing a glass body comprising subjecting a locally irregular surface portion of said body to reaction with a solution containing active hydrofluoric acid ingredients while mechanically removing the reaction products from only the high portions of said surface until the desired contour is formed by means of a member disposed in contact with said surface and sliding relative thereto in such manner as to continuously displace the by-products of the chemical reactions from only the high portions of said surface and to continuously replenish said solution in the regions of said high portions with fresh supplies of said active acid ingredients.

2. A method of shaping and finishing a glass body comprising subjecting a locally irregular surface portion of said body to reaction with a solution containing active hydrofluoric acid ingredients and a silica fluoride modifier ingredient while mechanically removing the reaction products from only the high portions of said surface until the desired contour is formed by means of a member disposed in contact with said surface and sliding relative thereto in such manner as to continuously displace the by-products of the chemical reactions from only the high portions of said surface and to continuously replenish said solution in the regions of said high portions with fresh supplies of said active acid ingredients.

3. A method of shaping and finishing a glass body comprising subjecting a locally irregular surface portion of said body to reaction with a solution containing active hydrofluoric acid ingredients and sulphuric acid while mechanically removing the reaction products from only the high portions of said surface until the desired contour is formed by means of a member disposed in contact with said surface and sliding relative thereto in such manner as to continuously displace the by-products of the chemical reactions from only the high portions of said surface and to continuously replenish said solution in the regions of said high portions with fresh supplies of said active acid ingredients.

4. A method of shaping and finishing a barium type glass body comprising subjecting a locally irregular surface portion of said body to reaction with a solution containing active hydrofluoric acid ingredients and a phosphoric acid ingredient while mechanically removing the reaction products from only the high portions of said surface until the desired contour is formed by means of a member disposed in contact with said surface and sliding relative thereto in such manner as to continuously displace the by-products of the chemical reactions from only the high portions of said surface and to continuously replenish said solution in the regions of said high portions with fresh supplies of said active acid ingredients.

5. A method of shaping and finishing a glass body comprising subjecting a surface portion of said body to an initial accurate abrading to prescribed general contour and then to reaction with a solution containing active hydrofluoric acid ingredients while mechanically removing the reaction products from only the high portions of said surface until the desired contour is formed by means of a member disposed in contact with said surface and sliding relative thereto in such manner as to continuously displace the by-products of the chemical reactions from only the high portions of said surface and to continuously replenish said solution in the regions of said high portions with fresh supplies of said active acid ingredients.

6. A method of shaping and finishing a glass body comprising subjecting a surface portion of said body to an initial accurate abrading to prescribed general contour and then to reaction with a solution containing active hydrofluoric acid ingredients and a silica fluoride modifier ingredient while mechanically removing the reaction products from only the high portions of said surface until the desired contour is formed by means of a member disposed in contact with said surface and sliding relative thereto in such manner as to continuously displace the by-products of the chemical reactions from only the high portions of said surface and to continuously replenish said solution in the regions of said high portions with fresh supplies of said active acid ingredients.

7. A method of shaping and finishing a glass body comprising subjecting a surface portion of said body to an initial accurate abrading to prescribed general contour and then to reaction with a solution containing active hydrofluoric acid ingredients and sulphuric acid while mechanically removing the reaction products from only the high portions of said surface until the desired contour is formed by means of a member disposed in contact with said surface and sliding relative thereto in such manner as to continuously displace the by-products of the chemical reactions from only the high portions of said surface and to continuously replenish said solution in the regions of said high portions with fresh supplies of said active acid ingredients.

8. A method of shaping and finishing a barium type glass body comprising subjecting a surface portion of said body to an initial accurate abrading to prescribed general contour and then to reaction with a solution containing active hydrofluoric acid ingredients and a phosphoric acid ingredient while mechanically removing the reaction products from only the high portions of said surface until the desired contour is formed by means of a member disposed in contact with said surface and sliding relative thereto in such a manner as to continuously displace the by-products of the chemical reactions from only the high portions of said surface and to continuously replenish said solution in the regions of said high portions with fresh supplies of said active acid ingredients.

9. A method of shaping and finishing a glass body comprising subjecting a surface portion of said body to an initial accurate abrading to prescribed general contour and then to reaction with a solution containing active hydrofluoric acid ingredients while mechanically removing the reaction products from only the high portions of said surface until the desired contour is formed by means of a member disposed in contact with said surface and sliding relative thereto in such manner as to continuously displace the by-products of the chemical reactions from only the high portions of said surface and to continuously replenish said solution in the regions of said high portions with fresh supplies of said active acid ingredients, said member being sufficiently pliable to adapt it to conform to the general contour provided by said abrading throughout the operation.

10. A method of shaping and finishing a glass body comprising subjecting a locally irregular surface portion of said body to reaction with a solution containing active hydrofluoric acid ingredients while mechanically removing the reaction products from only the high portions of said surface until the desired contour is formed.

11. A method of shaping and finishing a glass body comprising subjecting a locally irregular surface portion of said body to reaction with a solution containing active hydrofluoric acid ingredients and a silica fluoride modifier ingredient while mechanically removing the reaction products from only the high portions of said surface until the desired contour is formed.

12. A method of shaping and finishing a glass body comprising subjecting a locally irregular surface portion of said body to reaction with a solution containing active hydrofluoric acid ingredients and sulphuric acid while mechanically removing the reaction products from only the high portions of said surface until the desired contour is formed.

13. A method of shaping and finishing a barium type glass body comprising subjecting a locally irregular surface portion of said body to reaction with a solution containing active hydrofluoric acid ingredients and a phosphoric acid ingredient while mechanically removing the reaction products from only the high portions of said surface until the desired contour is formed.

14. A method of shaping and finishing a glass body comprising subjecting a surface portion of said body to an initial accurate abrading to prescribed general contour and then to reaction with a solution containing active hydrofluoric acid ingredients while mechanically removing the reaction products from only the high portions of said surface until the desired contour is formed.

15. A method of shaping and finishing a glass body comprising subjecting a surface portion of said body to an initial accurate abrading to prescribed general contour and then to reaction with a solution containing active hydrofluoric acid ingredients and a silica fluoride modifier ingredient while mechanically removing the reaction products from only the high portions of said surface until the desired contour is formed.

16. A method of shaping and finishing a glass body comprising subjecting a surface portion of said body to an initial accurate abrading to prescribed general contour and then to reaction with a solution containing active hydrofluoric acid ingredients and sulphuric acid while mechanically removing the reaction products from only the high portions of said surface until the desired contour is formed.

17. A method of shaping and finishing a barium type glass body comprising subjecting a surface portion of said body to an initial accurate abrading to prescribed general contour and then to reaction with a solution containing active hydrofluoric acid ingredients and a phosphoric acid ingredient while mechanically removing the reaction products from only the high portions of said surface until the desired contour is formed.

18. A method of shaping and finishing a glass body comprising immersing the body in an aqueous hydrofluoric acid bath and mechanically removing the products of the reaction of said acid bath upon said body from only the high portions of said body until the desired contour thereof is formed.

ALFRED H. SHARPE.
VICTOR WALKER.